United States Patent
Kumar et al.

(10) Patent No.: US 10,812,416 B2
(45) Date of Patent: Oct. 20, 2020

(54) REDUCED NUMBER OF COUNTERS FOR RELIABLE MESSAGING

(71) Applicant: International Business Machines Corporation, Armonk, NY (US)

(72) Inventors: Sameer Kumar, White Plains, NY (US); Philip Heidelberger, Cortlandt Manor, NY (US); Dong Chen, Scarsdale, NY (US); Yutaka Sugawara, Eastchester, NY (US); Robert M. Senger, Tarrytown, NY (US); Burkhard Steinmacher-Burow, Esslingen am Neckar (DE)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 15/855,447

(22) Filed: Dec. 27, 2017

(65) Prior Publication Data
US 2019/0199653 A1  Jun. 27, 2019

(51) Int. Cl.
*H04L 12/861* (2013.01)
*H04L 12/879* (2013.01)
(Continued)

(52) U.S. Cl.
CPC ........ *H04L 49/9057* (2013.01); *G06F 9/544* (2013.01); *G06F 9/546* (2013.01);
(Continued)

(58) Field of Classification Search
CPC .............. H04L 49/9057; H04L 49/901; H04L 67/1097; G06F 9/544; G06F 9/546; G06F 9/547
See application file for complete search history.

(56) References Cited

U.S. PATENT DOCUMENTS 5,307,343 A    4/1994  Bostica et al.
5,963,731 A *  10/1999 Sagawa ............... G06F 17/5018
                                                        703/12
(Continued)

OTHER PUBLICATIONS

Stumm, M., et al., "Algorithms Implementing Distributed Shared Memory", Computer 23.5, May 1990, pp. 55-64.
(Continued)

*Primary Examiner* — Blake J Rubin
(74) *Attorney, Agent, or Firm* — Scully, Scott, Murphy & Presser, P.C.; Daniel P. Morris (57) ABSTRACT

A shared memory maintained by sender processes stores a sequence number counter per destination process. A sender process increments the sequence number counter in the shared memory in sending a message to a destination process. The sender process sends a data packet comprising the message and at least a sequence number specified by the sequence number counter. All of the sender processes share a sequence number counter per destination process, each of the sender processes incrementing the sequence number counter in sending a respective message. Receiver processes run on the hardware processor, each of the receiver processes maintaining a local memory counter on the memory, the local memory counter associated with a sending node. The local memory counter stores a sequence number of a message received from the sending node. The receiver process delivers incoming data packets ordered by sequence numbers of the data packets.

17 Claims, 4 Drawing Sheets

(51) Int. Cl.
*G06F 9/54* (2006.01)
*H04L 29/08* (2006.01)
*H04L 12/801* (2013.01)

(52) U.S. Cl.
CPC .............. *G06F 9/547* (2013.01); *H04L 47/34* (2013.01); *H04L 49/901* (2013.01); *H04L 67/1097* (2013.01)

(56) References Cited

U.S. PATENT DOCUMENTS

| | | | |
|---|---|---|---|
| 6,021,132 A | 2/2000 | Muller et al. | |
| 7,437,521 B1* | 10/2008 | Scott | G06F 9/30087 711/151 |
| 7,558,287 B2 | 7/2009 | Malik et al. | |
| 7,694,035 B2 | 4/2010 | Chen et al. | |
| 7,797,503 B2 | 9/2010 | Bellofatto et al. | |
| 7,890,670 B2 | 2/2011 | Archer et al. | |
| 8,146,094 B2 | 3/2012 | Arimilli et al. | |
| 8,650,338 B2 | 2/2014 | Blocksome et al. | |
| 8,738,860 B1* | 5/2014 | Griffin | G06F 13/4282 711/122 |
| 9,268,611 B2* | 2/2016 | Iyer | G06F 9/5027 |
| 9,997,232 B2* | 6/2018 | Murphy | G11C 11/4091 |
| 10,037,299 B1* | 7/2018 | Ramey | G06F 13/4022 |
| 10,148,581 B2* | 12/2018 | Shahar | H04L 47/18 |
| 2002/0147785 A1* | 10/2002 | Venkatsubramanian | G06F 9/544 709/213 |
| 2004/0015978 A1* | 1/2004 | Orii | G06F 11/3404 718/105 |
| 2005/0120183 A1* | 6/2005 | DeSota | G06F 12/0817 711/144 |
| 2006/0101314 A1* | 5/2006 | Husbands | G06F 12/0253 714/100 |
| 2006/0143350 A1* | 6/2006 | Miloushev | G06F 9/5088 710/242 |
| 2007/0291778 A1* | 12/2007 | Huang | H04L 1/1614 370/410 |
| 2007/0294663 A1* | 12/2007 | McGuire | G06F 8/45 717/108 |
| 2008/0092146 A1* | 4/2008 | Chow | G06F 15/173 719/313 |
| 2008/0256074 A1* | 10/2008 | Lev | G06F 9/526 |
| 2009/0119676 A1* | 5/2009 | Supalov | G06F 9/544 719/312 |
| 2010/0082788 A1* | 4/2010 | Mundy | G06F 9/52 709/223 |
| 2011/0125974 A1* | 5/2011 | Anderson | G06F 12/084 711/153 |
| 2011/0219208 A1* | 9/2011 | Asaad | G06F 12/0862 712/12 |
| 2012/0179760 A1* | 7/2012 | Blocksome | G06F 15/17306 709/206 |
| 2014/0059073 A1* | 2/2014 | Zhao | G06F 16/245 707/769 |
| 2014/0122560 A1* | 5/2014 | Ramey | G06F 15/17312 709/201 |
| 2014/0123146 A1* | 5/2014 | Barrow-Williams | G06F 9/4881 718/102 |
| 2014/0156954 A1* | 6/2014 | Janakiraman | H04L 12/56 711/152 |
| 2016/0299874 A1* | 10/2016 | Liao | G06F 17/16 |
| 2018/0046497 A1* | 2/2018 | Al-Jarro | G06F 9/46 |
| 2019/0102236 A1* | 4/2019 | Sur | G06F 9/3004 |
| 2019/0213146 A1* | 7/2019 | Islam | G06F 8/00 |

OTHER PUBLICATIONS

Kumar, S., et al. "The Deep Computing Messaging Framework: Generalized Scalable Message Passing on the Blue Gene/P Supercomputer", ICS '08, Jun. 7-12, 2008, pp. 94-103.

* cited by examiner

REDUCED NUMBER OF COUNTERS FOR RELIABLE MESSAGING

STATEMENT REGARDING FEDERALLY SPONSORED RESEARCH OR DEVELOPMENT

This invention was made with Government support under Contract No.: B554331 awarded by Department of Energy. The Government has certain rights in this invention.

FIELD

The present application relates generally to computer architecture, interprocess communication, shared memory, and network packets, and more particularly to reducing the number of counters in message passing.

BACKGROUND

Computers with physical hardware processors and for example, local memory, may be interconnected on a network, and communicate with one another in performing an overall task, for example, as in parallel processing. For instance, a collection of processors, each with its own memory, may be interconnected via a network and utilize message passing and/or shared memory for communications, for example, to read or write in each other's memory space, in performing a task. In parallel programming, the processors may perform functionalities such as starting processes, sending messages, receiving messages and synchronizing processes. Each processor may run multiple processes, and each process has a unique rank. The rank of a process is its position in the overall order of the processes. Counters are maintained in memory space to track completion, order, or sequence of the processes in parallel processing.

For instance, to retransmit dropped network packets, messaging software may maintain sliding windows and sequence numbers. A network packet, for instance, may include a message or block of data being communicated and header information about the message, for example, which may include, among others, a sequence number associated with the message. As an example, consider symmetric multiprocessing (SMP) that includes multiple identical processors connected to a single, shared main memory. An SMP node refers to a physical node, which includes one or more physical processors (e.g., central processing units (CPUs)). If there are N SMP nodes with P endpoints (processes) per node, then a total of P*P*N sequence numbers per node is needed, which can increase space usage significantly. That is, each endpoint here maintains one sequence number for every P*N endpoints.

BRIEF SUMMARY

A method and system of message passing between processes running on a plurality of computing nodes connected by a network may be provided. The method, in one aspect, may include maintaining a shared memory on a first node by first sender processes running on the first node. The shared memory stores a sequence number counter per destination process. The first sender processes share the sequence number counter for sending messages to the destination process. Multiple sequence number counters are maintained for multiple destination processes respectively. The method may also include incrementing by a sender process of the first sender processes, the sequence number counter in the shared memory for the sender process to send a message to the destination process, wherein the sender process sends a data packet comprising message data of the message and at least a sequence number specified by the sequence number counter. The method may also include maintaining by a first receiver process, a local memory counter associated with a sending node from which the first receiver process is receiving messages, the local memory counter maintained on the first node, wherein a plurality of first receiver processes run on the first node and each of the plurality of first receiver processes separately maintains a local memory counter per sending node. The method may also include delivering by the first receiver process, the incoming data packets in sequence number order.

A system, in one aspect, may include a memory coupled with the hardware processor. A communication interface may be coupled to the hardware process via which the hardware processor communicates with another computing node in a network of interconnected computing nodes. The hardware processor may be operable to run a plurality of sender processes, the sender processes operable to maintain a shared memory on the memory, the shared memory operable to store a sequence number counter per destination process, the sender processes sharing the sequence number counter for sending messages to the destination process, wherein multiple sequence number counters are maintained for multiple destination processes respectively. A sender process of the plurality of sender processes may be operable to increment the sequence number counter in the shared memory in sending a message to the destination process, wherein the sender process is operable to send a data packet comprising message data of the message and at least a sequence number specified by the sequence number counter. The hardware processor may be operable to run receiver processes. A receiver process of the receiver processes may be operable to maintain a local memory counter associated with a sending node from which the receiver process is receiving messages, the local memory counter maintained on the memory, wherein each of the receiver processes separately maintains a local memory counter per sending node. The receiver process may be further operable to deliver the incoming data packets in sequence number order.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

System, method and techniques are disclosed that reduce the number of needed counters maintained in computer interprocess communications, for example, in parallel processing system architecture.

Some operating systems allow ranks (or processes) on a node (physical processor or a collection of physical processors) to share a common region in physical memory as shared memory. Some computer architecture also support atomic operations on counters in shared memory. Examples of the atomic operations include increment, decrement, and fetch-add operations.

In some supercomputer systems, each CPU chip contains multiple CPU cores. In other supercomputer systems, a CPU chip may have only 1 CPU core. One or more such CPU chips can comprise a node. For example, a node can include 4 CPU chips, and each CPU chip can contain 8 CPU cores. In this case, each node has total of 4*8=32 CPU cores. Furthermore, CPU cores allow multiple threads to run simultaneously. If the CPU core can run 4 threads, the 32 CPU core node can run 32*4=128 total threads. There are multiple ways to divide the 32 cores/128 threads into processes, or ranks. Usually a process and a rank are equivalent and can be used interchangeably. In one example case with respect to the above example node configuration, an application can run 32 processes, each process running on one CPU core, i.e., each process has 4 threads. In another example case, one big process (128 threads) can grab all the 32 CPU cores.

An "endpoint" is an entity in a network or messaging mechanism that can send and/or receive a message. An endpoint has its own unique address and can send to and/or receive from another entity, and even itself. In conventional systems, each process (or rank) acts as an endpoint. On the 32-core node example described above, if there are 32 processes (ranks) on that one node, that node owns 32 endpoints. If there is only one big process (32-core/128 thread), there is only 1 endpoint on that node.

Consider an example, in which there are a total of 128 nodes in the system, each having 32 processes (ranks). Therefore, N=128 (number of nodes) and P=32 (number of endpoints in each node). With the existing mechanism, each process is 1 endpoint. Therefore, there are a total of P*N=32*128=4096 endpoints in the system. Each endpoint needs to communicate with these 4096 endpoints, and hence needs to track 4096 different sequence numbers, which means that each process or endpoint has 4096 counters. Therefore, on each node, there are total 4096*(32 processes/node)=131072 counters (in general P*P*N counters). The methodology of the present disclosure in one embodiment allows for sharing of the counters among the 32 processes on the same node. In this way, the node need not duplicate the array of 4096 counters 32 times. Rather, in this example, each node owns only P*N=4096 counters.

Such sharing makes a significant difference in memory usage. For instance, if there are N=100000 (100K nodes) and P=32 (32 processes on each node), and each counter is a 64-bit integer (8 bytes), the memory consumption on each node is P*P*N*(8 bytes/counter) =32*32*100000*8=819200000 bytes=800 MB. On the other hand, with the methodology of the present disclosure in one embodiment, each node consumes P*N*(8 bytes/counter)=32*100000*8=25600000 bytes=26 MB, providing for significant savings in memory space usage.

In one embodiment of a method and/or apparatus in the present disclosure, the sequence numbers for P*N endpoints on all destination nodes are stored in shared memory. An endpoint corresponds to one process or rank. A sequence number is an incrementing identifier (ID) attached to each message in increasing order. For example, when an endpoint X sends 3 messages to endpoint Y, the sequence number of the messages will be in a sequence of increasing numbers, for example, 0, 1, and 2, respectively. This example assumes that the initial sequence number is 0, but need not be so, and any other sequence number may be employed. In one embodiment, a sequence number is tracked for each destination endpoint. In one embodiment, if the endpoint X sends a message to endpoint Z, the sequence number will be independent from those messages going to endpoint Y. When each rank (a process) is about to send a message it executes an atomic increment on the sequence number corresponding to the endpoint to which the message is being sent. The receiving rank (process) orders messages from all ranks on sending node using the incoming sequence number. As described above, a node includes one or more processes (ranks). From hardware perspective, a node can include one or more CPU chips, and each CPU chip can contain one or more CPU cores. If the network is non-blocking and messages from one rank (process) on a node (a processor) do not block others the receiver endpoint will get all messages in the correct order.

Sharing of the counters among P processes on a node (e.g., among all sending processes on the same node) avoids duplicating the counters P times and thus reduces storage required for sequence numbers from P*P*N to P*N on each node. With a billion-way parallelism expected in some machines, this method provides for significant space reductions in memory.

For instance, in message passing with windows, a sender maintains a sequence number to each destination rank (destination process) and maintains windows of packets for each destination rank (destination process). Each packet has a message sequence number and a packet identifier in that message. A receiver maintains a sequence number for each sender endpoint, maintains a window of incoming packets and matches packets and/or messages in Message Passing Interface (MPI) match order. For instance, the receiver waits for messages to arrive in order according to sequence numbers. The receiver also stores the incoming packets in destination buffers. In this scheme, given N nodes and P ranks per node with total of N*P ranks, counter space needed is determined to be 2*N*P, for example, since each endpoint may act both as a receiver and a sender. A "sender" or "source" refers to an endpoint that sends a message to an endpoint. A "receiver" or "destination" refers to an endpoint that receives a message from a sender/source endpoint. In some embodiments, each endpoint (process, or rank) can be both sender and receiver at the same time. For instance, an endpoint may send and receive messages at the same time.

In one embodiment of the system and/or method of the present disclosure, send and receive counters are shared among the ranks on a node. Each process or endpoint need not have private send counters. Rather, each process or endpoint uses shared send counters when sending a new message. In this way, the total counters needed are reduced to 2*N*P.

Figure 1:
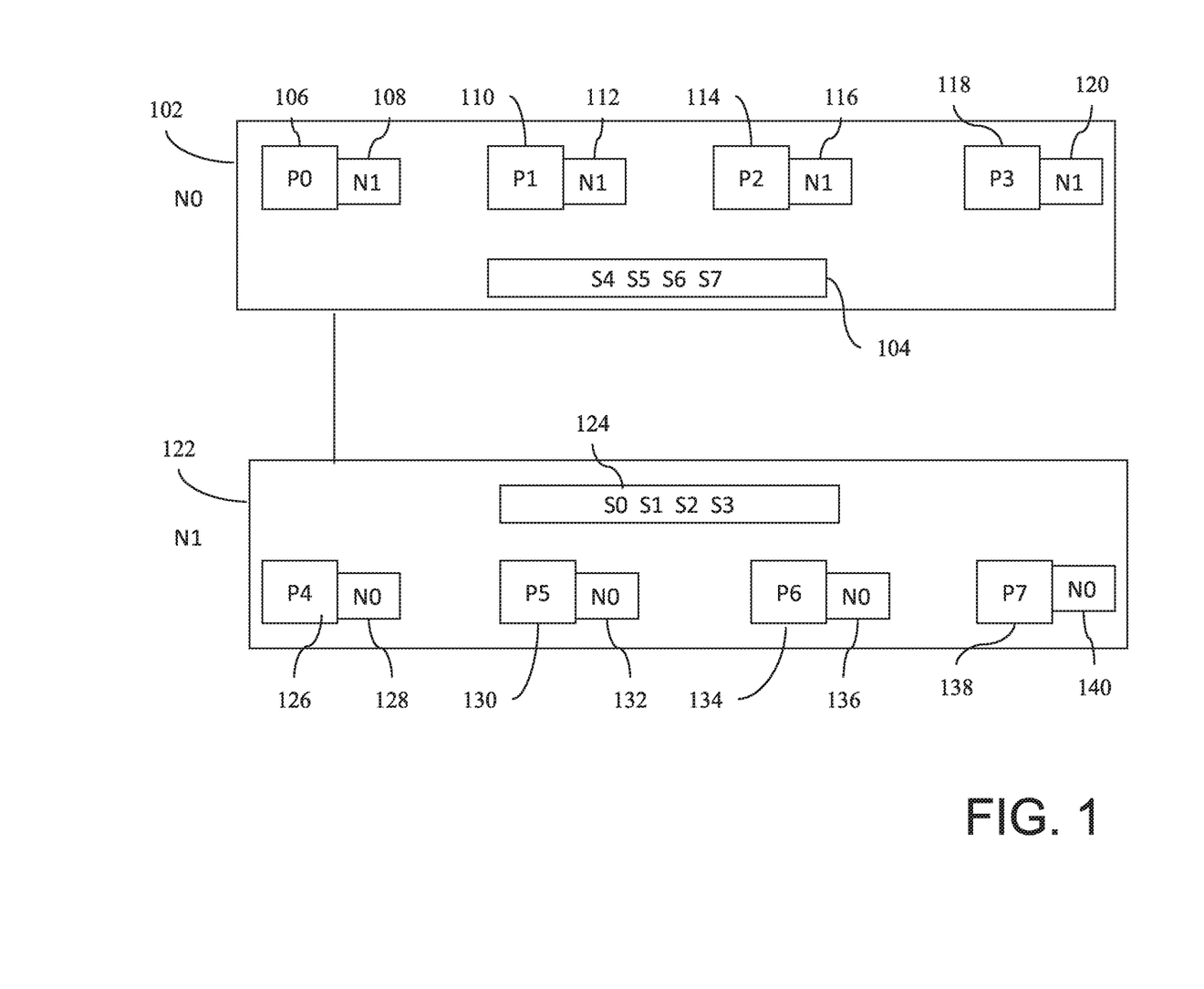
FIG. 1 is a diagram illustrating counters maintained by nodes in a parallel processing environment having multiple nodes with processes communicating with one another in one embodiment.

FIG. 1 is a diagram illustrating counters maintained by nodes in a parallel processing environment having multiple nodes with processes communicating with one another in one embodiment. In one embodiment of the system and/or method of the present disclosure, a sender (message sending process) maintains a shared send counter 104 for each destination rank (message receiving process), for example, one counter per destination rank (or endpoint). The shared counter in shared memory is shared by all sender processes running on a computing node. For instance, all sender processes (e.g., labeled P0, P1, P2, and P3) in a node (e.g., shown at 102 and labeled as N0) maintain a shared counter 104. A sender process at N0 node 102 may perform an atomic increment operation on the shared counter 104 associated with a destination rank. In one embodiment, there is one dedicated counter for each destination rank. For example, in FIG. 1, node N0 has one counter for each possible destination process. For example, the shared memory counter labeled in FIG. 1 at 104 as S4 is used when any one of P0, P1, P2, P3 is sending a message to P4. Similarly, the shared memory counters labeled in FIG. 1 at 104 as S5, S6, S7 are used when sending a message to P5, P6, and P7, respectively. The sender (e.g., a sender process at N0 node 102) may also maintain windows (a range of sequence numbers where messages have been sent but may be waiting for acknowledgements from the receiver rank) for each active destination rank. As an example, if a sending process receives an acknowledgement for sequence number 101 before sequence number 100, at this point the sending process does not exclude sequence number 100 from the window, and thus sequence number 101 still stays in the window even though it is actually acknowledged. An implementation for windows comprising a range of sequence numbers may employ a technique used in standard Internet TCP/IP. For example, in one example window implementation, the sender side remembers (e.g., by temporary storing in memory) the oldest (smallest, subject to counter overflow) sequence number (ack #) that is still waiting acknowledgement from the receiver (i.e., the oldest "incomplete" message). The sender cannot send a new message beyond sequence number ack #+WS, where WS is the window size. For example, if WS=64, the sender can send up to 64 messages without receiving an acknowledgement. The range from ack # to ack #+WS is called a window, and all the outstanding messages fall in this range. In this way the receiver can reject duplicate/stale messages that have a sequence number outside the window. The window size can be constant or variable. The sender uses a shared counter sequence number (e.g., that is incremented each time a packet is sent) for each destination endpoint in a packet of a message.

In one embodiment, a receiver (a message receiving process) may maintain a single counter for each sender node in private memory, for example, local to the receiver process. The single counter stores a sequence number for received messages. For example, the node at N0 shown at 102 may have 4 receiving processes, P0, P1, P2 and P3. The receiver process P0 at 106 maintains a counter 108 for a node that it is receiving a message from (in this example N1 122). Similarly, the receiver process P1 at 110 maintains a counter 112 for a node (in this example N1 122) that it is receiving a message from. Likewise, the receiver process P2 at 114 maintains a counter 116 for a node that it is receiving a message from (in this example N1 122). The receiver process P3 at 118 maintains a counter 120 for a node that it is receiving a message from (in this example N1 122). The receiver processes may maintain a window (in memory) of incoming packets from each sending node. The receiver processes may deliver packets in MPI match order from each sending node. The receiver processes may assume that sender ranks in a node will always send messages after incrementing shared counters. In this way, deadlocks do not occur.

Similarly, node N1 at 122 as a sender may maintain a shared counter 124 for each destination rank (message receiving process). For instance, all sender processes (e.g., labeled P4, P5, P6, and P7) in the node 122 maintain a shared counter 124. For instance S0, S1, S2, S3 denote shared send counters that are used when sending messages to N0's P0, P1, P2, P3 respectively. A sender process at N1 node 122 may perform an atomic increment operation on the shared counter 124 associated with a destination rank. The sender (e.g., a sender process at N1 node 122) may also maintain a window for each active destination rank. The sender uses a shared counter sequence number (e.g., that is incremented each time a packet is sent) in each packet of a message. For example, all senders share a counter sequence number for a destination rank.

In one embodiment, a receiver (a message receiving process) may maintain a single counter for each sender node in private memory, for example, local to the receiver process. For example, the node at N1 shown at 122 may have 4 receiving processes, P4, P5, P6 and P7. The receiver process P4 at 126 maintains a counter 128 for a node that it is receiving a message from (in this example N0 102). Similarly, the receiver process P5 at 130 maintains a counter 132 for a node (in this example N0 102) that it is receiving a message from. Likewise, the receiver process P6 at 134 maintains a counter 136 for a node that it is receiving a message from (in this example N0 102). The receiver process P7 at 138 maintains a counter 140 for a node that it is receiving a message from (in this example N0 102). While the figure shows one counter for N0 that a receiving process maintains, generally, the receiving process maintains one counter for each node in the system. The receiver processes may maintain a window of incoming packets from each sending node. The receiver processes may deliver packets in MPI match order from each sending node. The receiver processes may assume that sender ranks in a node will always send messages after incrementing shared counters. In this way, deadlocks do not occur.

For managing packet loss, in one embodiment, receiver processes may send acknowledgments when packets in a message have been delivered. When a packet is dropped, the receiver (a receiver intended to receive a packet) does not acknowledge the message, forcing a sender rank to timeout and retransmit the packet. Receivers may throw away packets with sequence numbers they have already received, for example, duplicates.

Referring to FIG. 1, the shared memory shown at 104 include a group of 4 counters as example (1 counter per destination process) that are shared by all the sending processes (P0, P1, P2, P3) on node N0. Without the methodology of the present disclosure, each sending process would have its own private group of counters for every destination process (e.g., shared memory shown at 104 with its 4 counters S4, S5, S6, S7 would be replicated 4 times, so that each sending process P0, P1, P2, P3 would have 4 private counters, for a total of 16 counters on N0). In the system and/or method of the present disclosure in some embodiments, the 4 separate counters S0, S1, S2, S3 in shared memory 104 are shared by P0, P1, P2, and P3. In some embodiments, the counters are used to generate unique sequence numbers. If multiple senders on N0 are all sending to the same process (e.g., P4) on N1, they can share the same counter (e.g., S4), but they do not share the same sequence number. Atomically incrementing a shared send counter ensures that each new message being sent will have a unique sequence number.

Figure 2:
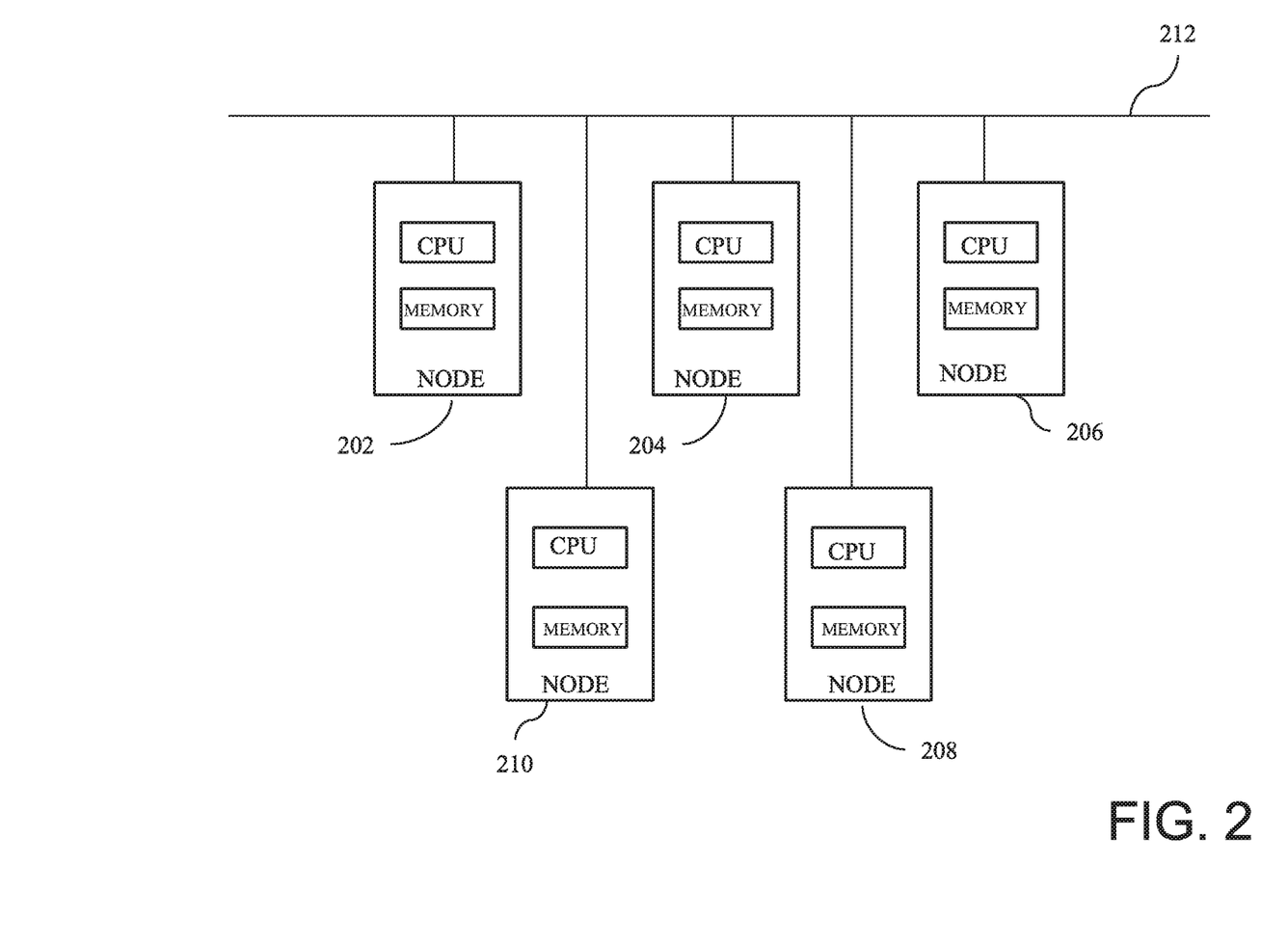
FIG. 2 is an architectural diagram illustrating parallel computing environment that may implement the message counters of the present disclosure in one embodiment.

FIG. 2 is an architectural diagram illustrating parallel computing environment that may implement the message counters of the present disclosure in one embodiment. A computing environment may include multiple nodes 202, 204, 206, 208, 210 connected via a network 212. Each node comprises hardware, for example, one or more processors such as CPUs and/or other processors, and memory. The memory at each node may contain private areas and shared areas. Private memory area is local to a process and the shared memory area may be shared among processes running on that node. For example, the schematics shown in FIG. 1 may be implemented on each of the nodes 202, 204, 206, 208, 210. The "private memory" and "shared memory" indicate whether a given portion of memory is visible to a process or not. From hardware perspective, the CPU chip(s) have shared memory which can be accessed by any CPU core on the node. But the operating system ("OS") can set up page tables so that a particular memory area can be accessed only by one process (which is referred to herein as private memory). The OS can also set up page tables so that a memory area can be accessed by multiple processes (shared memory).

Figure 3:
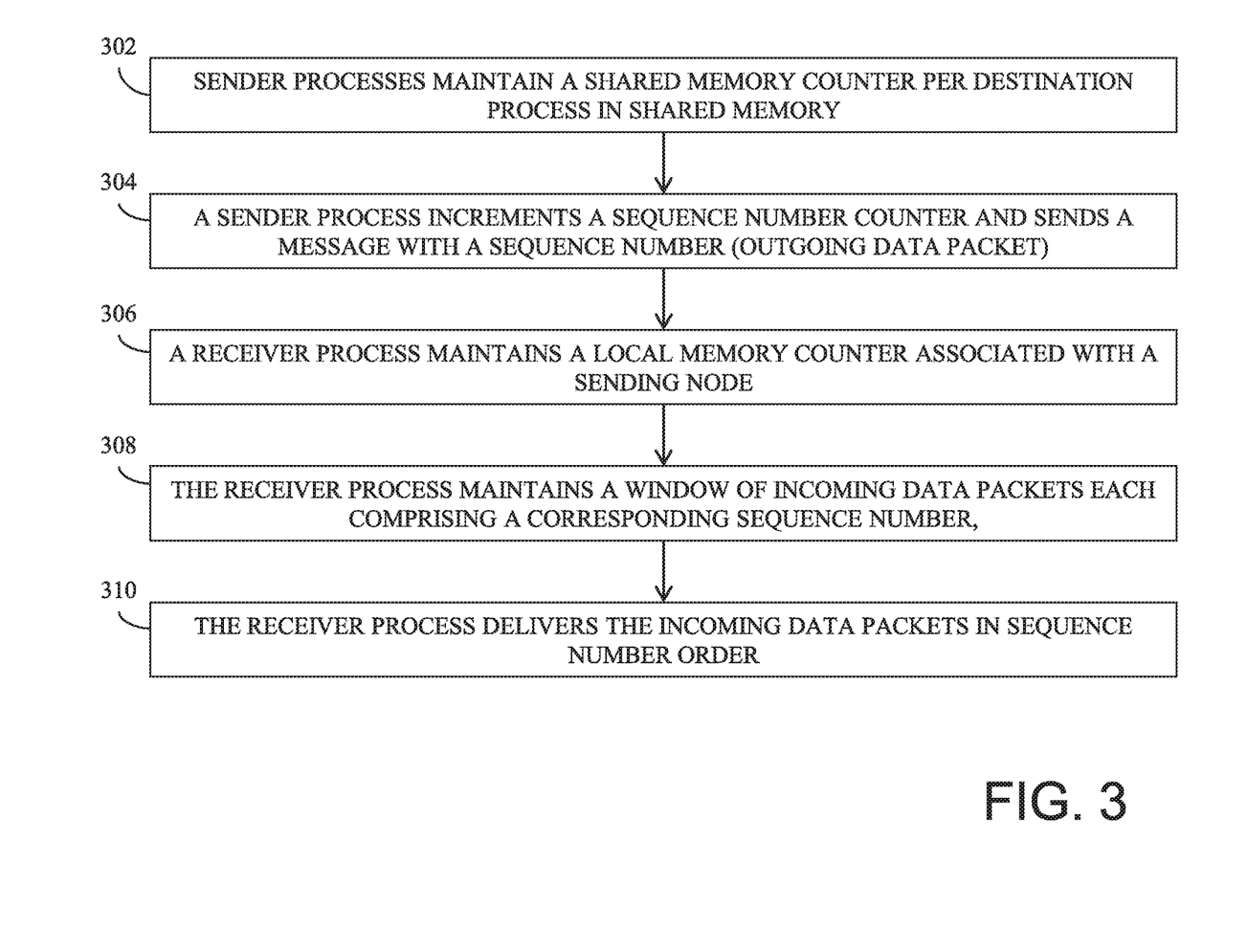
FIG. 3 is a flow diagram illustrating a method of reducing counter memory space in message passing in one embodiment.

FIG. 3 is a flow diagram illustrating a method of reducing counter memory space in message passing in one embodiment. At 302, sender processes (also referred to as first sender processes) running on a computing node (also referred to as a first node) maintains a shared memory, the shared memory storing a sequence number counter per destination process. For instance, one sequence number counter is maintained for each destination process of destination processes to which the sender processes are sending messages. Sender processes (e.g., all sender processes on a node) share the sequence number counter associated with the destination process, when sending messages to that destination process. Multiple sequence number counters may be maintained for multiple destination processes respectively, for example, one sequence number counter for each of the multiple destination processes. The sender process uses a different (shared) counter for each destination. At 304, a sender process atomically increments a sequence number counter in the shared memory associated with a destination process for the sender process to send a message to the destination process. The sender process sends a data packet that includes message data and at least the sequence number, for example, specified by the sequence number counter. The procedures may repeat when a process needs to send messages to multiple destination processes. In one embodiment, all of the first sender processes running on the computing node share the sequence number counter stored in the shared memory, each of the first sender processes atomically incrementing the sequence number counter in sending a respective message. For example, if another sender process is sending a message to the same destination process, that other sender process increments the same sequence number counter associated with this same destination process, and uses the incremented sequence number in sending its message. In this way, while the sequence number counter is shared among the sender processes on a node, the shared sequence number counter provides each sender process a unique sequence number for sending with its message.

At 306, a receiver process (also referred to as a first receiver process) runs on the computing node and maintains a local memory counter associated with a sending node from which the first receiver process is receiving messages. The receiver process maintains the local memory counter in the local memory space of that receiver. A plurality of receiver processes run on the computing node and each of the plurality of first receiver processes separately maintains a local memory counter per sending node. At 308, the receiver process maintains a window of incoming data packets each comprising a corresponding sequence number. At 310, the receiver process delivers the incoming data packets in the order of associated sequence numbers.

Figure 4:
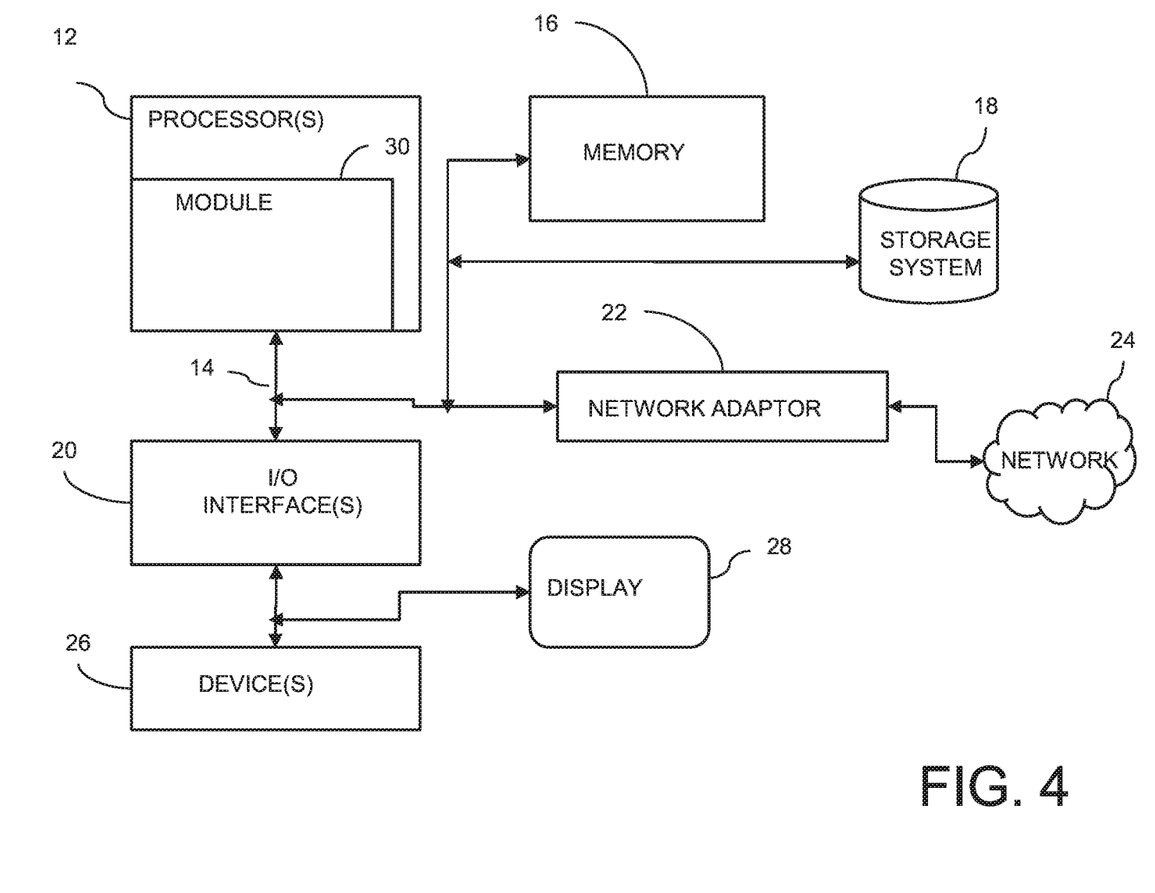
FIG. 4 illustrates a schematic of an example computer or processing system that may implement a message passing system in one embodiment of the present disclosure.

FIG. 4 illustrates a schematic of an example computer or processing system that may implement a message passing system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, supercomputers, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others.

Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of message passing between processes running on a plurality of computing nodes connected by a network, the method comprising:
maintaining a shared memory on a first node by first sender processes running on the first node, the shared memory storing a sequence number counter per destination process, all of the first send processes sharing one sequence number counter in the shared memory of the first node, said one sequence number corresponding to one destination process, wherein multiple sequence number counters in the shared memory of the first node are maintained for multiple destination processes respectively;
incrementing by a sender process of the first sender processes, the sequence number counter in the shared memory for the sender process to send a message to the destination process, wherein the sender process sends a data packet comprising the message and at least a sequence number specified by the sequence number counter, wherein each of the first sender processes uses a shared counter sequence number specified in the sequence number counter stored in the shared memory, the shared counter sequence number counter being updated each time a packet is sent;
maintaining by a first receiver process, a local memory counter associated with a sending node from which the first receiver process is receiving messages, the local memory counter maintained on the first node, wherein a plurality of first receiver processes run on the first node and each of the plurality of first receiver processes separately maintains a local memory counter per sending node; and
delivering by the first receiver process, the incoming data packets in sequence number order.

2. The method of claim 1, further comprising:
maintaining by the first sender process a window of outgoing packets.

3. The method of claim 1, wherein the sender process performs an atomic operation to increment the sequence number counter in the shared memory.

4. The method of claim 1, wherein the first node and the sending node are physical hardware connected by a communication network.

5. The method of claim 1, wherein the sender process sends the data packet by invoking Message Passing Interface.

6. The method of claim 1, wherein the first receiver process receives the incoming data packets by invoking Message Passing Interface.

7. A computer readable storage medium storing a program of instructions executable by a machine to perform a method of message passing between processes running on a plurality of computing nodes connected by a network, the method comprising:
maintaining a shared memory on a first node by first sender processes running on the first node, the shared memory storing a sequence number counter per destination process, all of the first send processes sharing one sequence number counter in the shared memory of the first node, said one sequence number corresponding to one destination process, wherein multiple sequence number counters in the shared memory of the first node are maintained for multiple destination processes respectively;
incrementing by a sender process of the first sender processes, the sequence number counter in the shared memory for the sender process to send a message to the destination process, wherein the sender process sends a data packet comprising the message and at least a sequence number specified by the sequence number counter, wherein each of the first sender processes uses a shared counter sequence number specified in the sequence number counter stored in the shared memory, the shared counter sequence number counter being updated each time a packet is sent;
maintaining by a first receiver process, a local memory counter associated with a sending node from which the first receiver process is receiving messages, the local memory counter maintained on the first node, wherein a plurality of first receiver processes run on the first node and each of the plurality of first receiver processes separately maintains a local memory counter per sending node; and delivering by the first receiver process, the incoming data packets in sequence number order.

8. The computer readable storage medium of claim 7, further comprising:
maintaining by the first sender process a window of outgoing packets.

9. The computer readable storage medium of claim 7, wherein the sender process performs an atomic operation to increment the sequence number counter in the shared memory.

10. The computer readable storage medium of claim 7, wherein the first node and the sending node are physical hardware connected by a communication network.

11. The computer readable storage medium of claim 7, wherein the sender process sends the data packet by invoking Message Passing Interface.

12. The computer readable storage medium of claim 7, wherein the first receiver process receives the incoming data packets by invoking Message Passing Interface.

13. A system comprising:
a hardware processor; and
a memory coupled with the hardware processor; and
a communication interface coupled to the hardware process via which the hardware processor communicates with another computing node in a network of interconnected computing nodes,
the hardware processor operable to run a plurality of sender processes, the sender processes operable to maintain a shared memory on the memory, the shared memory operable to store a sequence number counter per destination process, all of the first send processes sharing one sequence number counter in the shared memory of the first node, said one sequence number corresponding to one destination process, wherein multiple sequence number counters in the shared memory of the first node are maintained for multiple destination processes respectively, wherein each of the first sender processes uses a shared counter sequence number specified in the sequence number counter stored in the shared memory, the shared counter sequence number counter being updated each time a packet is sent, a sender process of the plurality of sender processes operable to increment the sequence number counter in the shared memory in sending a message to the destination process, wherein the sender process is operable to send a data packet comprising the message and at least a sequence number specified by the sequence number counter;
the hardware processor operable to run receiver processes, a receiver process of the receiver processes operable to maintain a local memory counter associated with a sending node from which the receiver process is receiving messages, the local memory counter maintained on the memory, wherein each of the receiver processes separately maintains a local memory counter per sending node, the receiver process further operable to deliver the incoming data packets in sequence number order.

14. The system of claim 13, wherein the sender process is further operable to maintain a window of outgoing packets.

15. The system of claim 13, wherein the sender process is operable to perform an atomic operation to increment the sequence number counter in the shared memory.

16. The system of claim 13, wherein the sender process is operable to send the data packet by invoking Message Passing Interface.

17. The system of claim 13, wherein the first receiver process receives the incoming data packets by invoking Message Passing Interface.

* * * * *